United States Patent
Liu et al.

(10) Patent No.: US 10,647,874 B2
(45) Date of Patent: May 12, 2020

(54) POLYMER DISPERSION FOR DURABLE COATING, AND THE COATING COMPRISING THE SAME

(71) Applicant: Rohm and Haas Company, Collegeville, PA (US)

(72) Inventors: Hui Liu, Shanghai (CN); Jianming Xu, Shanghai (CN); Yujiang Wang, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 98 days.

(21) Appl. No.: 16/066,416

(22) PCT Filed: Jan. 21, 2016

(86) PCT No.: PCT/CN2016/071564
§ 371 (c)(1),
(2) Date: Jun. 27, 2018

(87) PCT Pub. No.: WO2017/124370
PCT Pub. Date: Jul. 27, 2017

(65) Prior Publication Data
US 2019/0002726 A1    Jan. 3, 2019

(51) Int. Cl.
| | | |
|---|---|---|
| *C09D 139/04* | (2006.01) | |
| *C08K 3/22* | (2006.01) | |
| *C09D 133/08* | (2006.01) | |
| *C09D 7/61* | (2018.01) | |
| *C09D 5/32* | (2006.01) | |
| *C09D 5/28* | (2006.01) | |
| *C09D 133/10* | (2006.01) | |
| *C09D 133/26* | (2006.01) | |
| *C09D 5/02* | (2006.01) | |

(52) U.S. Cl.
CPC .............. *C09D 139/04* (2013.01); *C08K 3/22* (2013.01); *C09D 5/028* (2013.01); *C09D 5/32* (2013.01); *C09D 7/61* (2018.01); *C09D 133/08* (2013.01); *C09D 133/10* (2013.01); *C09D 133/26* (2013.01); *C08K 2003/2241* (2013.01)

(58) Field of Classification Search
CPC .. C09D 139/04; C09D 133/08; C09D 133/10; C09D 133/26; C09D 7/61; C09D 5/32; C09D 5/028; C08K 3/22
USPC ......................................................... 524/548
See application file for complete search history.

(56) References Cited

U.S. PATENT DOCUMENTS

| | | | |
|---|---|---|---|
| 5,518,818 A | 5/1996 | Kidai et al. | |
| 6,036,891 A * | 3/2000 | Liao | ..................... C07D 249/18 |
| | | | 252/588 |
| 6,187,845 B1 * | 2/2001 | Renz | ................. B32B 17/10743 |
| | | | 524/91 |
| 6,281,313 B1 | 8/2001 | Nakano et al. | |
| 6,368,521 B1 | 4/2002 | Sasaki et al. | |
| 7,915,322 B2 * | 3/2011 | Hung | ..................... C08F 220/26 |
| | | | 523/105 |
| 8,729,203 B2 | 5/2014 | Higgs et al. | |
| 2001/0025198 A1 | 9/2001 | Faubl | |
| 2010/0103352 A1* | 4/2010 | Suzuki | ................ B29C 48/9155 |
| | | | 349/96 |

FOREIGN PATENT DOCUMENTS

| | | | |
|---|---|---|---|
| CN | 102888186 A | * | 1/2013 |
| CN | 104387884 A | * | 3/2015 |
| CN | 104387884 A | | 3/2015 |
| CN | 102888186 B | | 10/2015 |
| WO | 2005063912 A1 | | 7/2005 |

OTHER PUBLICATIONS

International Search Report for International Application No. PCT/CN2016/071564 filed on Jan. 21, 2016, 3 pages.
Written Opinion for International Application No. PCT/CN2016/071564 filed on Jan. 21, 2016, 3 pages.

* cited by examiner

*Primary Examiner* — Michael Bernshteyn
(74) *Attorney, Agent, or Firm* — Karl E. Stauss; Cantor Colburn LLP

(57) ABSTRACT

The present invention provides a coating composition comprising a polymer binder and from 1% to 40% by dry weight based on total dry weight of the coating composition, titanium dioxide particles, wherein the polymer binder comprises, as polymerized units, by dry weight based on total dry weight of the polymer binder, from 50% to 99%, ethylenically unsaturated nonionic monomers, and from 1% to 5%, a vinyl functionalized benzotriazole.

14 Claims, No Drawings

POLYMER DISPERSION FOR DURABLE COATING, AND THE COATING COMPRISING THE SAME

FIELD OF THE INVENTION

The present invention relates to a polymer dispersion for durable titanium dioxide-containing coating. It further relates to a titanium dioxide-containing coating composition with improved outdoor durability, especially gloss retention.

INTRODUCTION

Durability including ultraviolet (UV) stability is a basic requirement to outdoor coatings for providing longer coating (shelf) life and better visible properties like gloss retention. Usually, UV resistance additives such as hindered amine light stabilizers (HALS) and anti-oxidants are added to coating formulations to improve UV stability. Such UV resistance additives act to slow down the degradation of polymer lattice by reacting with the by-products formed by the UV radiation, rather than absorbing the UV radiation. Adding such additives in the coatings has significant disadvantages. Such additives are usually difficult to disperse well within the polymer matrix and will easily cause non-homogeneity, which will produce inconsistent UV resistance. Some coating additives such as surfactants and dispersants may help disperse the UV resistance additives, but with excess usage may lead to water resistance.

UV absorber monomers permanently bonded to the polymer backbone may also achieve desired UV stability but only in clear coating formulations. It does not work well in coating formulations comprising titanium dioxide ($TiO_2$). Titanium dioxide is a photocatalyst under UV light and can oxidize water to create hydroxyl radicals. The hydroxyl radicals will accelerate the degradation of the polymer backbone, and cause significant gloss loss or discoloration of coatings. Therefore, in $TiO_2$-containing coatings, higher level of UV absorber monomers is needed to provide acceptable UV resistance performance. However, higher level of UV absorber monomer will hurt the polymerization kinetics of the polymer backbone and affect the final performance of the coatings.

It is therefore desired to provide a new polymer binder for $TiO_2$-containing coatings. The polymer binder comprises a new UV absorber monomer and provides the coating with significantly improved UV stability.

SUMMARY OF THE INVENTION

The present invention provides a coating composition comprising a polymer binder and from 1% to 40% by dry weight based on total dry weight of the coating composition, titanium dioxide particles, and the polymer binder comprises, as polymerized units, by dry weight based on total dry weight of the polymer binder, from 50% to 99%, ethylenically unsaturated nonionic monomers, and from 1% to 5%, a vinyl functionalized benzotriazole having the following Structure (I):

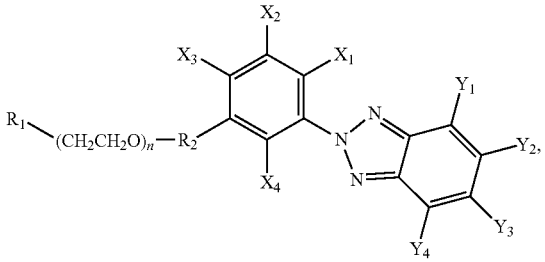

among which, n is an integer of from 6 to 40; $R_1$ is a vinyl-containing group selected from methyl acrylate, methacrylamide, acrylate, acrylamide, vinyl ether, and allyl ether; $R_2$ is selected from $C_{1-4}$ alkylene and $C_{1-5}$ alkylenylcarboxy; $X_1$, $X_2$, $X_3$ or $X_4$ is each independently selected from H, $C_{1-10}$alkyl, OH and $OCH_3$; and $Y_1$, $Y_2$, $Y_3$ or $Y_4$ is each independently selected from H, OH and $OCH_3$.

DETAILED DESCRIPTION OF THE INVENTION

The Polymer Binder

The polymer binder comprises, as polymerized units, by dry weight based on total dry weight of the polymer binder, from 50% to 99%, preferably from 60% to 98%, and more preferably from 70% to 97%, ethylenically unsaturated nonionic monomers.

The ethylenically unsaturated nonionic monomers are $\alpha,\beta$-ethylenically unsaturated monomers without bearing an ionic charge between pH=1-14. Suitable examples of the ethylenically unsaturated nonionic monomers include (meth)acrylic ester monomers, i.e., methacrylic ester or acrylic ester monomers such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, 2-hydroxybutyl acrylate, 2-hydroxyethyl methacrylate, and 2-hydroxypropyl methacrylate; (meth)acrylonitrile; styrene and substituted styrene such as $\alpha$-methyl styrene, and vinyl toluene; butadiene; ethylene; propylene; $\alpha$-olefin such as 1-decene; vinyl ester such as vinyl acetate, vinyl butyrate, and vinyl versatate; and other vinyl monomers such as vinyl chloride and vinylidene chloride. Preferably, the $\alpha,\beta$-ethylenically unsaturated nonionic monomers are ethyl acrylate, methyl methacrylate, butyl acrylate, 2-ethylhexyl acrylate, and any combinations thereof.

Optionally, the polymer binder further comprises, as polymerized units, from 0.1% to 20%, preferably from 0.5% to 10%, and more preferably from 1% to 5%, by dry weight based on total dry weight of the polymer binder, an ethylenically unsaturated monomer carrying at least one functional group selected from carboxyl, carboxylic anhydride, hydroxyl, amide, amino, ureido, acetoacetate, sulphonate, phosphonate, and any combinations thereof. Suitable examples of these monomers are ethylenically unsaturated carboxylic or dicarboxylic acid such as acrylic or methacrylic acid, itaconic acid, and maleic acid; ethylenically unsaturated amide such as (meth)acrylamide; ethylenically unsaturated N-alkylolamide such as N-methylol(meth)acrylamide and 2-hydroxyethyl(meth)acrylamide; hydroxyalkyl ester of the carboxylic or dicarboxylic acid, such as hydroxyethyl (meth)acrylate and hydroxypropyl (meth)acrylate; amino-functional monomers such as N,N-dimethylaminoethyl methacrylate; ureido-functional monomers such as methacrylamidoethyl-2-imidazolidinone; monomers bearing acetoacetate-functional groups such as acetoacetoxyethyl methacrylate; and any combinations thereof.

The polymer binder of the present invention further comprises, as polymerized units, from 1% to 5%, preferably from 1.5% to 4.5%, and more preferably from 2% to 4%, by dry weight based on total dry weight of the polymer binder, a vinyl functionalized benzotriazole having the following Structure (I):

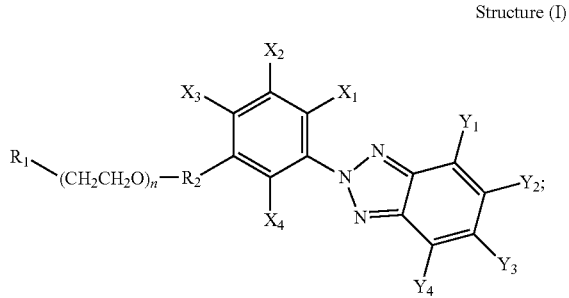

Structure (I)

wherein n is an integer of from 6 to 40, preferably from 6 to 30, and more preferably from 6 to 20;

wherein $R_1$ is a vinyl-containing group selected from methyl acrylate, methacrylamide, acrylate, acrylamide, vinyl ether, and allyl ether; preferably $R_1$ is methyl acrylate, methacrylamide, acrylate or acrylamide; and more preferably $R_1$ is methyl acrylate or acrylate;

wherein $R_2$ is selected from $C_{1-4}$ alkylene and $C_{1-5}$ alkylenylcarboxy, and is preferably ethylene or ethylenylcarboxy;

wherein $X_1$, $X_2$, $X_3$ or $X_4$ is each independently selected from H, $C_{1-10}$ alkyl, OH and $OCH_3$; and is preferably H, OH or t-butyl; and wherein $Y_1$, $Y_2$, $Y_3$ or $Y_4$ is each independently selected from H, OH and $OCH_3$; and is preferably H or OH.

The vinyl functionalized benzotriazole of the present invention preferably is 2-(2'-hydroxy-3'-tertbutyl-5'-methacrylethyloxylate ethylphenyl)-2H-benzotriazole having the following Structure (II):

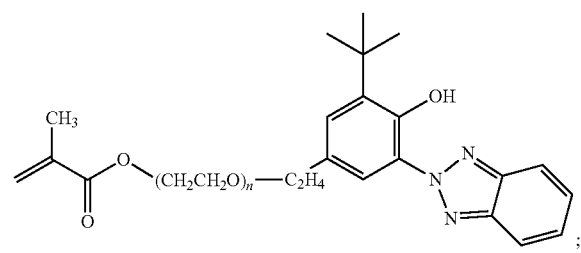

Structure (II)

wherein n is an integer of from 6 to 20;

or is 2-(2'-hydroxy-3'-tertbutyl-5'-methacrylethyloxylate ethylenylcarboxy phenyl)-2H-benzotriazole having the following Structure (III):

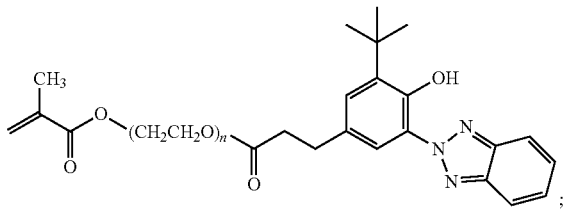

Structure (III)

wherein n is an integer of from 6 to 20.

The Coating Composition

The coating composition of the present invention comprises the polymer binder, and from 1% to 40%, preferably from 3% to 30%, and more preferably from 5% to 20%, by dry weight based on total dry weight of the coating composition, titanium dioxide particles.

Any titanium dioxide particles can be used in the coating composition of the present invention. Commercially available titanium dioxide particles include TI-PURE™ R-706 and TI-PURE R-902+ from DuPont, TIONA™ 595 from Millennium Inorganic Chemicals, TIOXIDE™ TR92 from Huntsman Corporation, LOMON™ R-996 and LOMON LR-997 from LOMON Corporation, BILLION™ BLR-688 and BILLION BLR-699 from Henan Billions Chemical Co., Ltd., DOGUIDE™ SR-237 from Shandong Doguide Group Co., Ltd., NTR-606 from Ningbo Xinfu Titanium Dioxide Co., Ltd., and R-2195 and R-2295 from Dawn Group. Preferably, the titanium dioxide particles are selected from TI-PURE R-706 and TI-PURE R-902+ available from DuPont.

The coating composition may further comprise other pigments or extenders.

As used herein, the term "pigment" refers to a particulate inorganic material which is capable of materially contributing to the opacity or hiding capability of a coating. Pigments typically have a refractive index of greater than 1.8 and include zinc oxide, zinc sulfide, barium sulfate, and barium carbonate. For the purpose of clarity, titanium dioxide particles of the present invention are not "pigment" of the present invention.

The term "extender" refers to a particulate inorganic materials having a refractive index of less than or equal to 1.8 and greater than 1.3 and include calcium carbonate, aluminium oxide ($Al_2O_3$), clay, calcium sulfate, aluminosilicate, silicate, zeolite, mica, diatomaceous earth, solid or hollow glass, and ceramic bead.

The coating composition may further contain at least one conventional coating additives such as coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, colorants, flowing agents, crosslinkers, and anti-oxidants.

Preparation of the Coating Composition

The preparation of the coating composition can be well-known methods of the art and involves the process of admixing appropriate coating ingredients in the indicated proportions to provide coating as well as the final dry coating film with the desired properties.

Application of the Coating Composition

The coating composition may be applied by conventional application methods such as brushing, roller application, and spraying methods such as air-atomized spray, air-assisted spray, airless spray, high volume low pressure spray, and air-assisted airless spray.

Suitable substrates for coating application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

EXAMPLES

I. Raw Materials

| Abbreviation | Chemical |
|---|---|
| BA | butyl acrylate |
| MMA | methyl methacrylate |
| (M)AA | (methyl)acrylic acid |
| SLS | sodium lauryl sulfate |
| EDTA | ethylene diamine tetraacetic acid |
| IAA | isoascorbic acid |
| t-BHP | tert-butyl hydroperoxide |
| APS | ammonium persulfate |
| AM | acrylamide |

| Chemical | Supplier |
|---|---|
| OROTAN ™ 731A dispersant | The Dow Chemical Company |
| TRITON ™ CF-10 wetting agent | The Dow Chemical Company |
| TRITON ™ X-405 wetting agent | The Dow Chemical Company |
| ACRYSOL ™ SCT-275 rheology modifier | The Dow Chemical Company |
| ACRYSOL ™ RM-2020 rheology modifier | The Dow Chemical Company |
| TRITON ™ CF-10 wetting agent | The Dow Chemical Company |
| TI-PURE ™ R-706 $TiO_2$ | DuPont Company |
| COASOL ™ coalescent | The Dow Chemical Company |
| TEXANOL ™ coalescent | Eastman Chemical Company |
| ROCIMA ™ 361 biocide | The Dow Chemical Company |
| BYK ™ 022 defoamer | BYK Additives & Instruments |
| KATHON ™ LXE biocide | The Dow Chemical Company |
| ROPAQUE ™ Ultra E opaque polymer | The Dow Chemical Company |
| PRIMAL ™ AC-261P binder | The Dow Chemical Company |

II. Test Procedures

1. Gloss Retention Test for $TiO_2$-Containing Coatings and Clear Coatings

Drawdown of coating compositions was made with a 150 μm Bird Film Applicator™ on an aluminum sheet (for $TiO_2$-containing coatings) or a 40% PVC coating (for clear coatings) (40% PVC coating formulation was described in Table 1). Coatings were allowed to dry for one week in a Constant Temperature Room (CTR) under 25° C. and the surface gloss of the dry coating at 60 degree geometry was determined by a BYK-Gardner Micro-TRI-Gloss 20/60/85 Gloss Meter, and was recorded as A1. Coatings were then put into a QUV Accelerated Weathering Tester from Q-Lab Corporation for 1800 hours (for clear coatings) and 1100 hours (for $TiO_2$-containing coatings), then taken out, and allowed to cool down and dry. The surface gloss of the dry coatings at 60 degree geometry was determined by the same Gloss Meter, and was recorded as A2. Gloss retention for each coating was calculated by the formula A2/A1×100% and recorded in Table 3.

TABLE 1

| 40% PVC coating formulation* | |
|---|---|
| Materials | (g) |
| *Grind* | |
| Water | 110 |
| propylene glycol | 26.00 |
| KATHON ™ LXE biocide | 0.80 |
| BYK ™ 022 defoamer | 0.20 |
| OROTAN ™ 731A dispersant | 5.00 |
| TI-PURE ™ R-706 $TiO_2$ | 190 |
| *Let-down* | |
| PRIMAL ™ AC-261P binder | 354 |
| ROPAQUE ™ Ultra E opaque polymer | 112 |
| TEXANOL ™ coalescent | 21.06 |
| TRITON ™ X-405 wetting agent | 2.00 |
| ACRYSOL ™ RM-2020 rheology modifier | 8.27 |
| Total | 829.33 |

*The Grind ingredients were mixed using a high speed Cowles disperser. The Let-down ingredients were added using a conventional lab mixer.

III. Experimental Examples

1. Preparation for Polymer Binders

1) Comparative Polymer Binder 1

A monomer emulsion was prepared by mixing 855.1 g BA, 993.1 g MMA, 18.87 g AA, 18.6 g 50% AM solution, 22.59 g 28% SLS solution, and 475 g deionized (DI) water and emulsified with stirring. 22.59 g 28% SLS solution and 706 g DI water were then charged to a five-liter multi-neck flask fitted with mechanical stirring. The contents of the flask were heated to 90° C. under a nitrogen atmosphere. To the stirred flask, 5.61 g sodium carbonate in 21.7 g DI water, 56.4 g of the monomer emulsion, 7.71 g APS in 23.9 g DI water were added. The remaining monomer emulsion, 0.96 g APS in 412 g DI water were then added gradually over 65 minutes to the flask. Reactor temperature was maintained at 88° C. Then, 30 g DI water was used to rinse the emulsion feed line to the reactor. Thereafter, the reaction mixture was stirred at reaction temperature for one more hour and then cooled to room temperature. The final pH value was adjusted to 8.5 using $NH_4OH$ (25% active). Comparative Polymer Binder 1 has a solid of 50.27% and a particle size of 132 nm.

2) Comparative Polymer Binder 2

Comparative Polymer Binder 2 was prepared by a similar procedure according to that for preparing Comparative Polymer Binder 1, but using a different monomer emulsion. The monomer emulsion for Comparative Polymer Binder 2 was prepared by mixing 855.1 g BA, 983.7 g MMA, 18.87 g AA, 18.6 g 50% AM solution, 9.4 g UV absorber monomer B, 22.59 g 28% SLS solution and 475 g DI water with stirring. Comparative Polymer Binder 2 has a solid of 49.98% and a particle size of 137 nm.

3) Comparative Polymer Binder 3

Comparative Polymer Binder 3 was prepared by a similar procedure according to that for preparing Comparative Polymer Binder 1, but using a different monomer emulsion. The monomer emulsion was prepared by mixing 855.1 g BA, 983.7 g MMA, 18.87 g AA, 18.6 g 50% AM solution, 9.4 g UV absorber monomer A, 22.59 g 28% SLS solution and 475 g DI water with stirring. Comparative Polymer Binder 3 has a solid of 49.93% and a particle size of 137 nm.

4) Comparative Polymer Binder 4

Comparative Polymer Binder 4 was prepared by a similar procedure according to that for preparing Comparative Polymer Binder 1, but using a different monomer emulsion. The monomer emulsion was prepared by mixing 855.1 g BA, 964.9 g MMA, 18.87 g AA, 18.6 g 50% AM solution, 28.2 g UV absorber monomer B, 22.59 g 28% SLS solution and 475 g DI water with stirring. Comparative Polymer Binder 4 has a solid of 49.92% and a particle size of 136 nm.

5) Polymer Binder 5

Polymer Binder 5 was prepared by a similar procedure according to that for preparing Comparative Polymer Binder 1, but using a different monomer emulsion. The monomer emulsion was prepared by mixing 855.1 g BA, 964.9 g MMA, 18.87 g AA, 18.6 g 50% AM solution, 28.2 g UV absorber monomer A, 22.59 g 28% SLS solution and 475 g DI water with stirring. Polymer Binder 5 has a solid of 50.12% and a particle size of 136 nm.

6) Polymer Binder 6

Polymer Binder 6 was prepared by a similar procedure according to that for preparing Comparative Polymer Binder 1, but using a different monomer emulsion. The monomer emulsion was prepared by mixing 855.1 g BA, 964.9 g MMA, 18.87 g AA, 18.6 g 50% AM solution, 18.8 UV absorber monomer A, 22.59 g 28% SLS solution and 475 g DI water with stirring. Polymer Binder 6 has a solid of 49.85% and a particle size of 130 nm.

7) Polymer Binder 7

Polymer Binder 7 was prepared by a similar procedure according to that for preparing Comparative Polymer Binder 1, but using a different monomer emulsion. The monomer emulsion was prepared by mixing 855.1 g BA, 964.9 g MMA, 18.87 g AA, 18.6 g 50% AM solution, 56.4 g UV absorber monomer A, 22.59 g 28% SLS solution and 475 g DI water with stirring. Polymer Binder 7 has a solid of 49.91% and a particle size of 136 nm.

2. Preparation for Coating Compositions

1) Preparation for Clear Coatings 100 g Polymer Binder and 5 g TEXANOL™ coalescent were mixed and agitated for 24 hours to prepare the clear coatings.

2) Preparation for 18 PVC Titanium Dioxide-Containing Coatings

18 PVC titanium dioxide-containing coatings were prepared according to the procedure of Table 2. The Grind ingredients were mixed using a high speed Cowles disperser. The Let-down ingredients were added using a conventional lab mixer.

TABLE 2

| 18 PVC titanium dioxide-containing coating formulation | |
|---|---|
| Materials | (g) |
| Grind | |
| Water | 5.75 |
| Propylene Glycol anti freezing agent | 5.50 |
| KATHON ™ LXE biocide | 0.20 |
| TRITON ™ CF-10 wetting agent | 0.50 |
| BYK ™ 022 defoamer | 0.11 |
| OROTAN ™ 731A dispersant | 1.50 |
| TI-PURE ™ R-706 TiO₂ | 50.75 |
| Let-down | |
| Polymer Binder | 142.50 |
| TEXANOL ™ coalescent | 3.25 |
| TRITON ™ X-405 wetting agent | 0.50 |
| ROCIMA ™ 361 biocide | 1.75 |
| Water | 34.75 |

TABLE 2-continued

| 18 PVC titanium dioxide-containing coating formulation | |
|---|---|
| Materials | (g) |
| ACRYSOL ™ RM-2020 NPR rheology modifier | 3.75 |
| ACRYSOL ™ SCT-275 rheology modifier | 0.75 |
| Total | 251.56 |

IV. Results

Comparative Polymer Binders 1 to 4 and Polymer Binders 5 to 7 were each made into a clear coating and a 18 PVC TiO₂-containing coating for gloss retention test.

TABLE 3

| Gloss retention with different UV absorber | | | |
|---|---|---|---|
| | | Gloss retention for coatings | |
| Polymer Binders | UV absorber monomer * | Clear Coatings | 18 PVC TiO₂-containing Coatings |
| Comparative Polymer Binder 1 | — | 9.09% | 51.42% |
| Comparative Polymer Binder 2 | 0.5% B | 36.36% | 54.28% |
| Comparative Polymer Binder 3 | 0.5% A | 89.78% | 52.86% |
| Comparative Polymer Binder 4 | 1.5% B | 48.86% | 54.28% |
| Polymer Binder 5 | 1.5% A | 89.77% | 68.6% |
| Polymer Binder 6 | 1% A | 88.64% | 60% |
| Polymer Binder 7 | 3% A | 89.77% | 77% |

* by dry weight based on total dry weight of the Polymer Binder.

UV absorber monomer A is 2-(2'-hydroxy-3'-tertbutyl-5'-methacrylethyloxylate ethylenylcarboxy phenyl)-2H-benzotriazole having the Structure (III) with n being 6, while UV absorber monomer B is 2-(2'-hydroxy-5'-methacryl ethylphenyl)-2H-benzotriazole having the following Structure (IV) comprising no repeating unit of CH₂CH₂O,

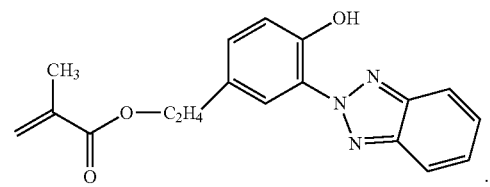

Structure (IV)

The primary difference between UV absorber monomer A and UV absorber monomer B is that UV absorber monomer A comprised 6 CH₂CH₂O repeating unit (n=6), while UV absorber monomer B comprised no CH₂CH₂O repeating unit. UV absorber monomer A is the vinyl functionalized benzotriazole of the present invention, while UV absorber monomer B is not.

As shown in Table 3, Comparative Polymer Binders 2 to 4 polymerizing either UV absorber monomer, compared to Comparative Polymer Binder 1 which did not polymerize any UV absorbers, had improved gloss retentions for clear coatings, but barely improved gloss retentions for 18 PVC TiO₂-containing coatings. Comparative Polymer Binder 3 (polymerized UV absorber monomer A) had an even better gloss retention in the clear coating compared to Comparative Polymer Binders 2 and 4 (polymerized UV absorber monomer B).

Polymer Binders 5 to 7 polymerizing higher level UV absorber monomer A (at least 1% by dry weight based on total dry weight of the polymer binder) provided significantly improved gloss retentions to both clear coatings, and 18 PVC TiO₂-containing coatings as well. It could be concluded that not only the particular UV absorber, but also the loading level played important roles to the gloss retention of TiO₂-containing coatings.

What is claimed is:

1. A coating composition comprising a polymer binder, and from 1% to 40% by dry weight based on total dry weight of the coating composition, titanium dioxide particles, wherein the polymer binder comprises, as polymerized units, by dry weight based on total dry weight of the polymer binder, from 50% to 99%, ethylenically unsaturated nonionic monomers, and from 1% to 5%, a vinyl functionalized benzotriazole having the following Structure (I):

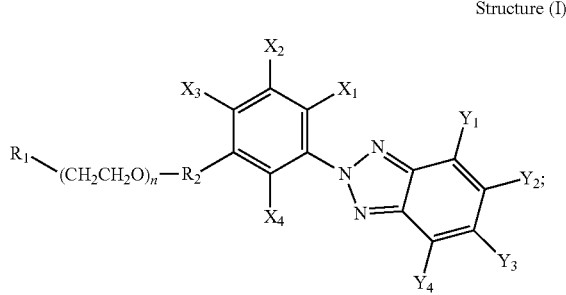

Structure (I)

wherein n is an integer of from 6 to 40;

wherein $R_1$ is a vinyl-containing group selected from methyl acrylate, methacrylamide, acrylate, acrylamide, vinyl ether, and allyl ether;

wherein $R_2$ is selected from $C_{1-4}$ alkylene and $C_{1-5}$ alkylenylcarboxy;

wherein $X_1$, $X_2$, $X_3$ or $X_4$ is each independently selected from H, $C_{1-10}$ alkyl, OH and $OCH_3$; and wherein $Y_1$, $Y_2$, $Y_3$ or $Y_4$ is each independently selected from H, OH and $OCH_3$.

2. The coating composition according to claim 1 wherein the polymer binder further comprises, as polymerized units, from 0.1% to 20% by dry weight based on total dry weight of the polymer binder, an ethylenically unsaturated monomer carrying at least one functional group selected from the group consisting of carboxyl, carboxylic anhydride, hydroxyl, amide, amino, ureido, acetoacetate, sulphonate, and phosphonate.

3. The coating composition according to claim 1 wherein the vinyl functionalized benzotriazole is a 2-(2'-hydroxy-3'-tertbutyl-5'-methacrylethyloxylate ethylphenyl)-2H-benzotriazole having the following Structure (II):

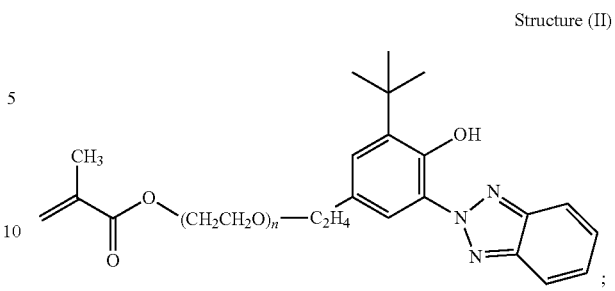

Structure (II)

wherein n is an integer of from 6 to 20.

4. The coating composition according to claim 1 wherein the vinyl functionalized benzotriazole is a 2-(2'-hydroxy-3'-tertbutyl-5'-methacrylethyloxylate ethylenylcarboxy phenyl)-2H-benzotriazole having the following Structure (III):

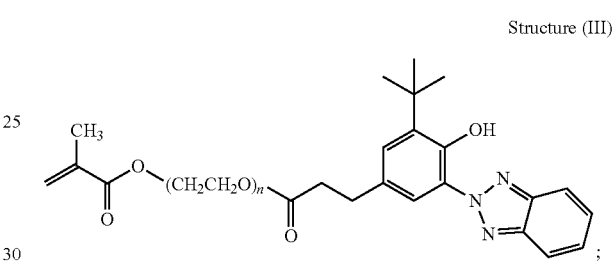

Structure (III)

wherein n is an integer of from 6 to 20.

5. The coating composition according to claim 1 wherein the vinyl functionalized benzotriazole having the Structure (I) is from 2% to 4% by dry weight based on total dry weight of the polymer binder.

6. The coating composition according to claim 1 wherein the vinyl functionalized benzotriazole having the Structure (I) has an $R_1$ of being methyl acrylate or acrylate.

7. The coating composition according to claim 1 wherein the vinyl functionalized benzotriazole having the Structure (I) has an $R_2$ being ethylene or ethylenylcarboxy.

8. The coating composition according to claim 1 wherein the vinyl functionalized benzotriazole having the Structure (I) has any of $X_1$, $X_2$, $X_3$ and $X_4$ being H, OH or t-butyl.

9. The coating composition according to claim 1 wherein the vinyl functionalized benzotriazole having the Structure (I) has any of $Y_1$, $Y_2$, $Y_3$ and $Y_4$ being H or OH.

10. The coating composition according to claim 1 wherein the polymer binder comprises, as polymerized units, by dry weight based on total dry weight of the polymer binder, from 60% to 98% of the ethylenically unsaturated nonionic monomers.

11. The coating composition according to claim 1, wherein ethylenically unsaturated nonionic monomer is selected from the group consisting of methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, 2-hydroxybutyl acrylate, 2-hydroxyethyl methacrylate, 2-hydroxypropyl methacrylate, (meth)acrylonitrile, α-methyl styrene, vinyl toluene, butadiene, ethylene, propylene, 1-decene, vinyl acetate, vinyl butyrate, vinyl versatate, vinyl chloride vinylidene chloride, and a combination thereof.

12. The coating composition according to claim 1, wherein ethylenically unsaturated nonionic monomer is selected from the group consisting of ethyl acrylate, methyl methacrylate, butyl acrylate, 2-ethylhexyl acrylate, and any combination thereof.

13. The coating composition according to claim 2, wherein the ethylenically unsaturated monomer carrying at least one functional group is selected from the group consisting of acrylic acid, methacrylic acid, itaconic acid, maleic acid, (meth)acrylamide, N-methylol(meth)acrylamide, 2-hydroxyethyl(meth)acrylamide, hydroxyethyl (meth)acrylate, hydroxypropyl (meth)acrylate; N,N-dimethylaminoethyl methacrylate, methacrylamidoethyl-2-imidazolidinone; acetoacetoxyethyl methacrylate; and any combinations thereof.

14. The coating composition of claim 1, wherein the polymer binder comprises, as polymerized units, by dry weight based on total dry weight of the polymer binder, from 1.5% to 4.5% of the vinyl functionalized benzotriazole having Structure (I).

* * * * *